J. DREHER AND L. A. OLMSCHENK.
COMBINATION LIFTING JACK AND TIRE EXPANDER AND CONTRACTOR.
APPLICATION FILED AUG. 11, 1919. RENEWED JULY 12, 1921.

1,393,271.

Patented Oct. 11, 1921.

Inventors
J. Dreher &
L. A. Olmschenk

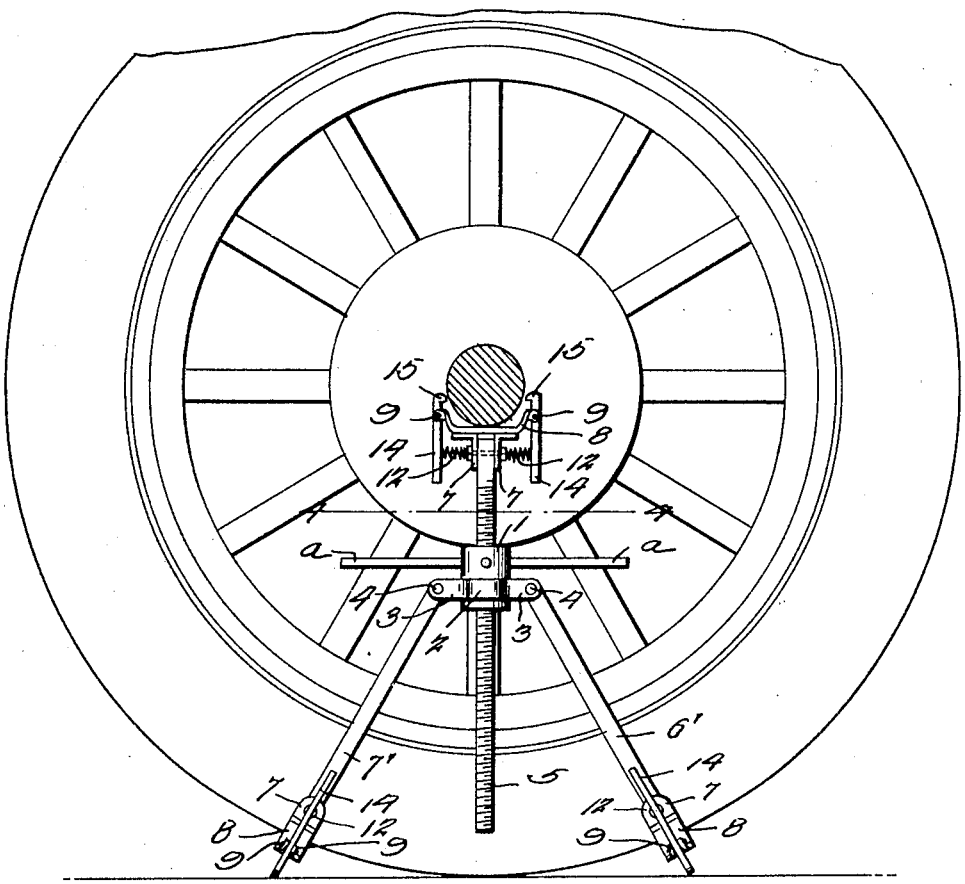
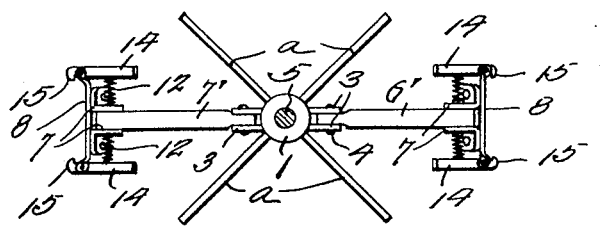

UNITED STATES PATENT OFFICE.

JOHN DREHER AND LAWRENCE A. OLMSCHENK, OF MIZPAH, MINNESOTA.

COMBINATION LIFTING-JACK AND TIRE EXPANDER AND CONTRACTOR.

1,393,271. Specification of Letters Patent. Patented Oct. 11, 1921.

Application filed August 11, 1919, Serial No. 316,635. Renewed July 12, 1921. Serial No. 484,192.

*To all whom it may concern:*

Be it known that we, JOHN DREHER and LAWRENCE A. OLMSCHENK, citizens of the United States, residing at Mizpah, in the county of Koochiching and State of Minnesota, have invented certain new and useful Improvements in a Combination Lifting-Jack and Tire Expander and Contractor, of which the following is a specification.

In our present invention we provide a combination lifting jack and tire expander and contractor, of such construction, that the same may be readily folded when not in use.

The primary object of our invention is to provide an automobile accessory simple and inexpensive in construction, and both durable and efficient in operation. The jack further can be shipped in a folded condition in such a manner that it can be set up with ease, accuracy and dispatch.

With these and other ends in view which will readily appear as the nature of the invention is better understood, the same consists in the improved construction and novel arrangement and combination of parts which will be hereinafter fully described and particularly pointed out in the claim.

In the accompanying drawing has been illustrated a simple and preferred form of the invention, it being, however, understood that no limitation is necessarily made to the precise structural details therein exhibited, but that changes, alterations and modifications within the scope of the claim may be resorted to when desired.

In the drawing:

Figure 1 is a view showing our jack as applied as a rim contractor.

Fig. 2 the invention as used as a jack.

Fig. 4 is a section on lines 4—4 of Fig. 2.

In carrying out the aim of our invention we employ a threaded collar 1, having a circumscribing groove, in which is revolubly held the band 2, in the form of two similar half sections, the ends 3, 3, of which are apertured and hold the securing pins 4', 4'.

Connected to this collar 1 are the two pivotally held arms 6' and 7', each of these arms being provided with a gripping head, while passing through the collar is the screw threaded bar 5, also having a gripping head secured to its upper end; as all three heads are similar in construction a description of one will suffice for all.

Figure 3:
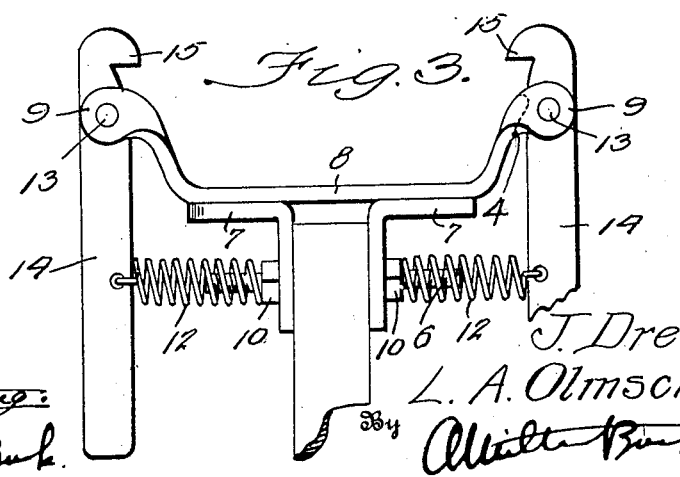
Fig. 3 is an enlarged view of one of the clamping heads.

Held to the outer end of each member 5, 6' and 7', by means of the screw stems 6, are the two similar right angular ears 7, 7, to which are fixed the head 8 having its opposite ends formed into two outwardly directed supporting ears 9—9, shown in Fig. 3, a stop shoulder 4 being located between each set of ears. The bolt stems hold the ears 7 in place each stem 6 extending outward below the head and ears as shown, the stems performing a double function in that they serve as guides for the springs 12 as well as holding the ears in place. Threading on the stems 6 are the nuts 10 by means of which the ears are held in position.

Figure 1:
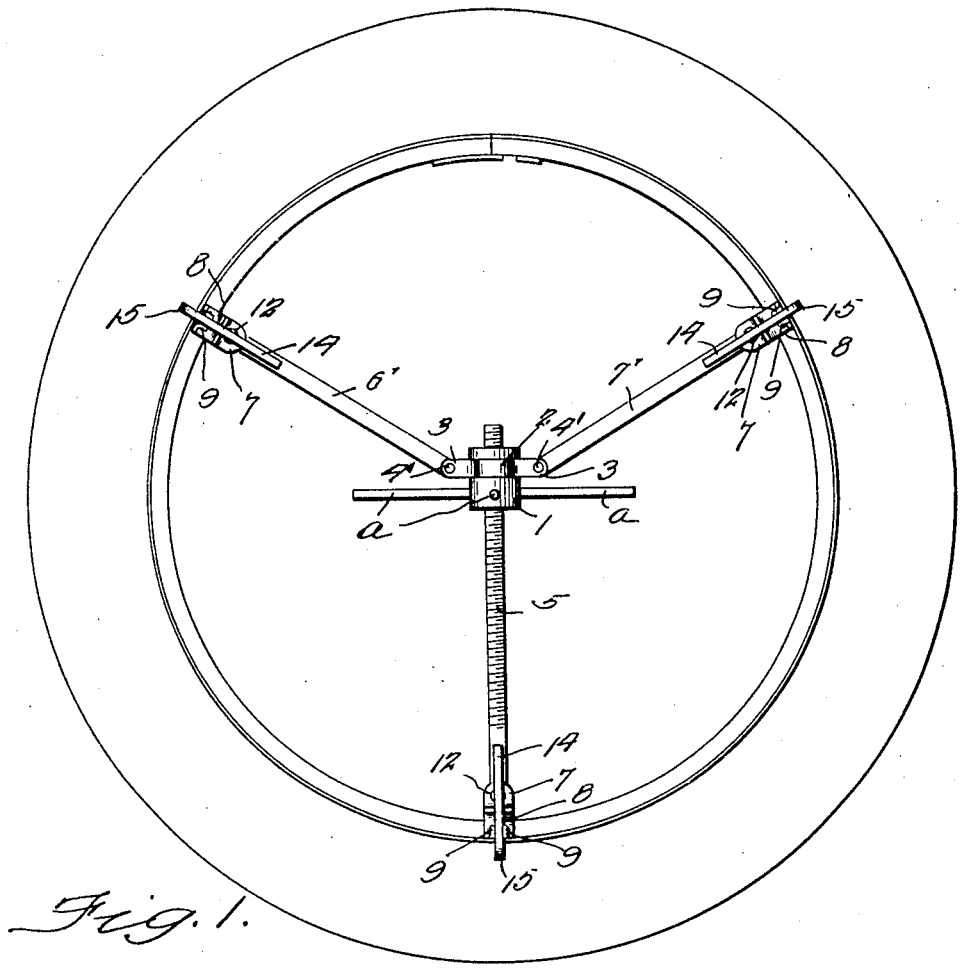

Held on the pins 13, in the ears 9, 9, are the fingers 14, each being held parallel to its supporting member, and having a clasping nose 15, for engaging a rim in the manner shown in Fig. 1. As disclosed the pivot pins 13 are located near the outer ends of the fingers so that these fingers are in the form of levers, are normally held against the intervening shoulders 4, permitting the same to be readily forced inward against the tension of the spring 12 when the device is used as a tire expander or contractor.

As disclosed in Fig. 3 the springs 12 are guided on the screw stems 6, and urge the fingers 14 outward so that in order to spring the heads on a rim the fingers 14 must be operated against the tension of the springs 12.

The outward movement of the fingers 14 is stopped in that the fingers strike against the part of the head located between the ears 9 as shown in Fig. 3.

The collar 1, is provided with a plurality of openings in which are held the capstan pins *a* by means of which the collar is rotated.

From the foregoing description, taken in connection with the accompanying drawings, the operation and advantages of our invention will be readily understood.

We have entered into a somewhat detailed description of the present and preferred embodiment of our invention in order to impart a definite understanding of the same. We do not desire, however, to be understood as restricting ourselves to the exact construction shown and described, as various changes or modifications may be made in the form, size, and minor details of construction without departing from the principles or sacrificing any of the advantages of this invention.

Having thus described our invention, what we claim, and desire to secure by Letters Patent, is:

In a device of the character described and in combination, a threaded collar having a circumscribing groove, a threaded bar held in said collar, a band held to said collar comprising two similar half sections each having two apertured ends, a pin in each of said ends, an arm pivotally held on each of said pins, a threaded stem passing through the outer end of each of said arms and said threaded bar, two oppositely positioned right angular ears, held on said stems, a head fixed to said ears, each head having a set of two outwardly directed supporting ears with an intervening stop shoulder, a pin in each set of ears, a finger held on each of said pins, each finger ending in a clasping nose, a nut on the ends of said stems to hold said ears and a spring on said projecting stem ends each spring forcing one of said fingers outwardly against a stop shoulder, as and in the manner set forth.

In testimony whereof, we affix our signatures.

JOHN DREHER.
LAWRENCE A. OLMSCHENK.